United States Patent
Watanabe et al.

(10) Patent No.: US 11,996,740 B2
(45) Date of Patent: May 28, 2024

(54) ROTOR, ELECTRIC MOTOR, COMPRESSOR, AND AIR CONDITIONER

(71) Applicant: Mitsubishi Electric Corporation, Tokyo (JP)

(72) Inventors: Takanori Watanabe, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 353 days.

(21) Appl. No.: 17/439,017

(22) PCT Filed: Mar. 26, 2019

(86) PCT No.: PCT/JP2019/012858
§ 371 (c)(1),
(2) Date: Sep. 14, 2021

(87) PCT Pub. No.: WO2020/194504
PCT Pub. Date: Oct. 1, 2020

(65) Prior Publication Data
US 2022/0149682 A1 May 12, 2022

(51) Int. Cl.
*H02K 1/27* (2022.01)
*F04C 29/00* (2006.01)
*H02K 1/276* (2022.01)
*H02K 29/03* (2006.01)

(52) U.S. Cl.
CPC ....... *H02K 1/2766* (2013.01); *F04C 29/0085* (2013.01); *F04C 2240/40* (2013.01); *H02K 29/03* (2013.01); *H02K 2213/03* (2013.01)

(58) Field of Classification Search
CPC ........ H02K 1/2766; H02K 1/276; H02K 1/27; H02K 1/2706; H02K 1/02; F04C 29/0085
See application file for complete search history.

(56) References Cited

U.S. PATENT DOCUMENTS

| 9,178,392 | B2* | 11/2015 | Yabe | H02K 1/2706 |
| 2006/0273678 | A1* | 12/2006 | Futami | H02K 1/276 |
| | | | | 310/156.53 |

(Continued)

FOREIGN PATENT DOCUMENTS

| CN | 206620033 U | 11/2017 |
| CN | 207782522 U | 8/2018 |

(Continued)

OTHER PUBLICATIONS

JP-2008187778-A machine translation Oct. 22, 2023.*

(Continued)

*Primary Examiner* — Leda T Pham
(74) *Attorney, Agent, or Firm* — POSZ LAW GROUP, PLC

(57) ABSTRACT

A rotor includes a rotor core and a permanent magnet. The rotor core includes an outside slit provided between a permanent magnet insertion hole and an outer peripheral surface of the rotor core, and inside slits provided between a magnetic pole center part and the outside slit. A minimum distance from a first inside slit to the outer peripheral surface of the rotor core is longer than a minimum distance from any other inside slit except the first inside slit to the outer peripheral surface of the rotor core.

10 Claims, 9 Drawing Sheets

(56) References Cited

U.S. PATENT DOCUMENTS

| | | | |
|---|---|---|---|
| 2010/0117477 A1* | 5/2010 | Yoshino | H02K 1/276 310/156.53 |
| 2013/0140922 A1 | 6/2013 | Yabe et al. | |
| 2015/0256038 A1 | 9/2015 | Nigo et al. | |

FOREIGN PATENT DOCUMENTS

| | | | |
|---|---|---|---|
| EP | 3273581 A1 | | 1/2018 |
| JP | 2008167520 A | | 7/2008 |
| JP | 2008-187778 A | | 8/2008 |
| JP | 2008187778 A | * | 8/2008 |
| JP | 2011-101595 A | | 5/2011 |
| JP | 5931213 B | | 5/2016 |
| WO | 2012/026032 A1 | | 3/2012 |

OTHER PUBLICATIONS

Office Action dated Aug. 11, 2022 in connection with counterpart Australian Patent Application No. 2019437867.

Office Action dated Mar. 7, 2022 in connection with corresponding IN Patent Application No. 202127042680.

Office Action dated May 17, 2022 in connection with counterpart Japanese Patent Application No. 2021-508467 (and English machine translation).

Extended European Search Report dated Feb. 22, 2022 issued in corresponding EP patent application No. 19921609.4.

International Search Report dated Jun. 18, 2019, issued in corresponding International Application No. PCT/JP2019/012858 (and English Machine Translation).

* cited by examiner

ROTOR, ELECTRIC MOTOR, COMPRESSOR, AND AIR CONDITIONER

CROSS-REFERENCE TO RELATED APPLICATION

This application is a U.S. National Stage Application of International Application No. PCT/JP2019/012858 filed on Mar. 26, 2019, the contents of which are incorporated herein by reference.

TECHNICAL FIELD

The present invention relates to a rotor for use in an electric motor.

BACKGROUND

In general, a rotor having a plurality of slots provided between a permanent magnet insertion hole of a rotor core and the outer peripheral surface of the rotor core has been proposed as a rotor for use in an electric motor. In this rotor, a harmonic component of a magnetic flux density waveform in an inter-pole part of the rotor is reduced, and thus cogging torque is reduced (see, for example, Patent Reference 1).

PATENT REFERENCE

Patent Reference 1: Japanese Patent Application Publication No. 2011-101595

In a conventional technique, however, a plurality of slits provided between a permanent magnet insertion hole and the outer peripheral surface of a rotor core increase a magnetic resistance and reduce an inductance. Consequently, a harmonic component of an induced voltage in a stator winding increases, and thus vibrations and noise in an electric motor increase.

SUMMARY

An object of the present invention is to reduce vibrations and noise in an electric motor.

A rotor according to an aspect of the present invention is a rotor including a magnetic pole center part and includes: a rotor core including a permanent magnet insertion hole having a V shape in a plane orthogonal to an axial direction of the rotor; and a permanent magnet disposed in the permanent magnet insertion hole, wherein the rotor core includes an outside slit provided between the permanent magnet insertion hole and an outer peripheral surface of the rotor core and extending in a circumferential direction of the rotor core, and a plurality of inside slits provided between the magnetic pole center part and the outside slit and arranged in the circumferential direction, the plurality of inside slits include a first inside slit adjacent to the magnetic pole center part, and a minimum distance from the first inside slit to the outer peripheral surface of the rotor core is longer than a minimum distance from any other inside slit except the first inside slit of the plurality of inside slits to the outer peripheral surface of the rotor core.

An electric motor according to another aspect of the present invention includes: a stator; and the rotor disposed inside the stator.

A compressor according to still another aspect of the present invention includes: a closed container; a compression device disposed inside the closed container; and the electric motor to drive the compression device.

An air conditioner according to yet another aspect of the present invention includes: the compressor; and a heat exchanger.

According to the present invention, vibrations and noise in the electric motor can be reduced.

DETAILED DESCRIPTION

First Embodiment

Figure 1:
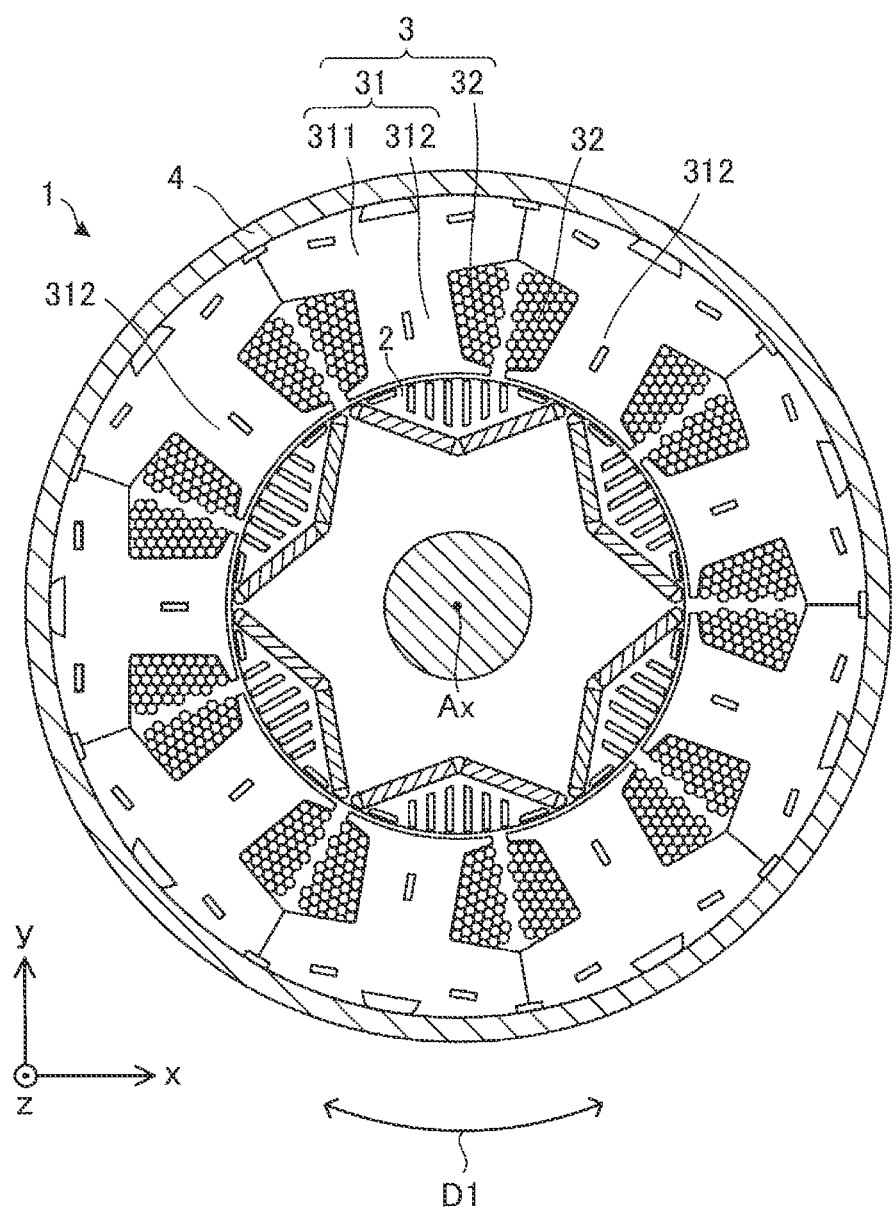
FIG. 1 is a cross-sectional view schematically illustrating a structure of an electric motor according to a first embodiment of the present invention.

In xyz orthogonal coordinate systems illustrated in the drawings, a z-axis direction (z axis) represents a direction parallel to an axis line Ax of an electric motor 1, an x-axis direction (x axis) represents a direction orthogonal to the z-axis direction (z axis), and a y-axis direction (y axis) represents a direction orthogonal to both the z-axis direction and the x-axis direction. An axis line Ax is a rotation center of a rotor 2. A direction parallel to the axis line Ax will be referred to as an "axial direction of the rotor 2" or simply as an "axial direction." A radial direction refers to a direction of a radius of the rotor 2 or a stator 3, and a direction orthogonal to the axis line Ax. An xy plane is a plane orthogonal to the axial direction. An arrow Dl represents a circumferential direction about the axis line Ax. The circumferential direction of the rotor 2 or the stator 3 will be referred to simply as a "circumferential direction."

FIG. 1 is a cross-sectional view schematically illustrating a structure of the electric motor 1 according to a first embodiment of the present invention.

The electric motor 1 includes the rotor 2 and the stator 3. The electric motor 1 is, for example, a permanent magnet synchronous motor (also referred to as a brushless DC motor) such as an interior permanent magnet electric motor. The electric motor 1 may also include a motor frame 4 (which will be referred to simply as a "frame") covering the stator 3.

The rotor 2 is rotatably disposed inside the stator 3. An air gap is present between the rotor 2 and the stator 3. The rotor 2 rotates about the axis line Ax.

The stator 3 includes a stator core 31 and at least one winding 32.

The stator core 31 is made of, for example, a plurality of electromagnetic steel sheets. In this case, the plurality of electromagnetic steel sheets are stacked in the axial direction. The plurality of electromagnetic steel sheets are fixed by swaging. Each electromagnetic steel sheet is processed to have a predetermined shape by press work such as punching.

The stator core 31 includes a ring-shaped yoke 311 and a plurality of teeth 312. The yoke 311 extends in the circumferential direction. Each of the teeth 312 extends in the radial direction. Specifically, each of the teeth 312 projects from the yoke 311 toward the axis line Ax. The plurality of teeth 312 are arranged at regular intervals in the circumferential direction and extend radially.

The winding 32 is wound around the stator core 31, specifically, around each of the teeth 312. An insulator may be disposed between the stator core 31 and the winding 32.

Figure 2:
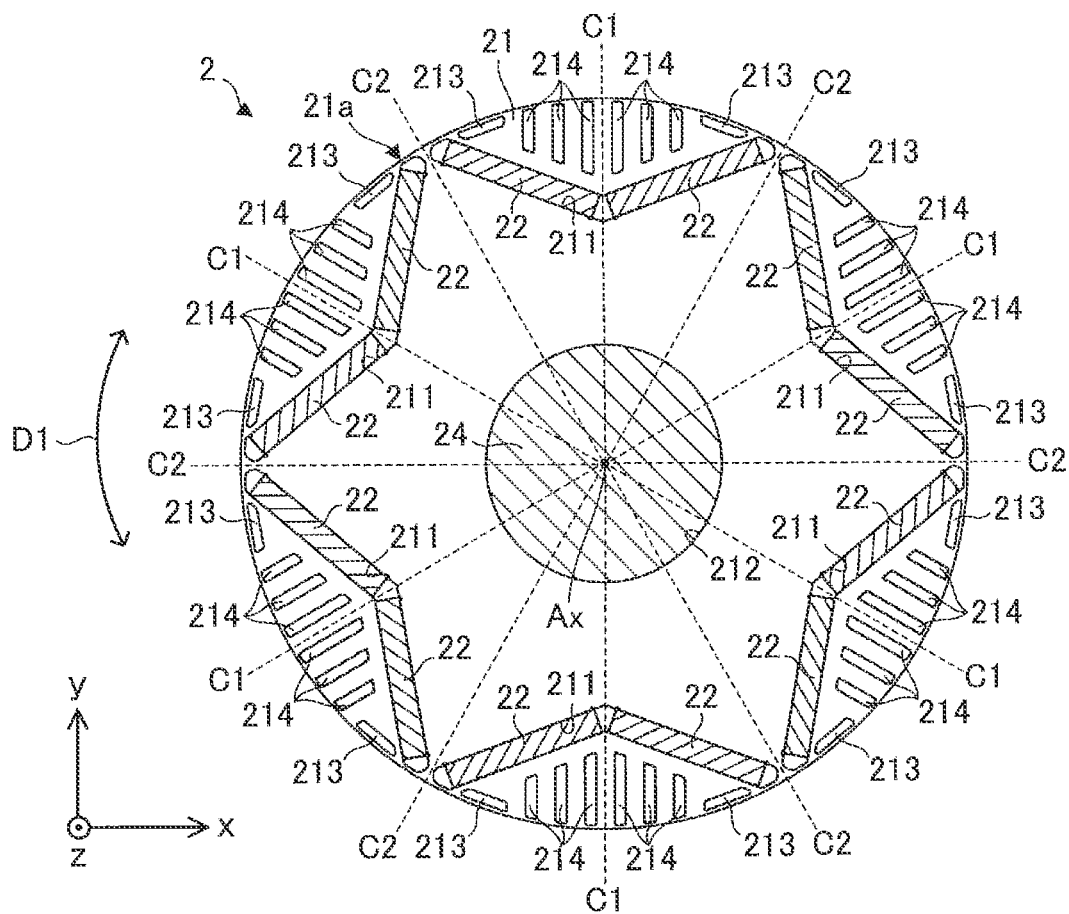
FIG. 2 is a cross-sectional view schematically illustrating a structure of a rotor.

FIG. 2 is a cross-sectional view schematically illustrating a structure of the rotor 2.

The rotor 2 includes a plurality of magnetic pole center parts C1 and a plurality of inter-pole parts C2. In the example illustrated in FIG. 2, the magnetic pole center parts C1 and the inter-pole parts C2 are indicated by broken lines.

Each of the magnetic pole center parts C1 is located at a center of each magnetic pole of the rotor 2 (i.e., a north pole or a south pole of the rotor 2). Each magnetic pole (which will also be referred to simply as "each magnetic pole" or "magnetic pole") of the rotor 2 means a region of the rotor 2 serving as a north pole or a south pole.

Each of the inter-pole parts C2 is a boundary between two magnetic poles adjacent to each other in the circumferential direction (i.e., a north pole and a south pole of the rotor 2).

The rotor 2 includes a rotor core 21, at least one permanent magnet 22 provided in the rotor core 21, and a shaft 24 fixed to the rotor core 21.

The rotor core 21 includes at least one permanent magnet insertion hole 211 and a shaft hole 212.

The rotor core 21 is made of, for example, a plurality of electromagnetic steel sheets. In this case, the plurality of electromagnetic steel sheets are stacked in the axial direction. The plurality of electromagnetic steel sheets are fixed by swaging. Each electromagnetic steel sheet is processed to have a predetermined shape by press work such as punching.

In this embodiment, the rotor core 21 has a plurality of permanent magnet insertion holes 211 (specifically six permanent magnet insertion holes 211). In the xy plane, the plurality of permanent magnet insertion holes 211 are arranged in the circumferential direction. The number of magnetic poles of the rotor 2 is two or more. Each permanent magnet insertion hole 211 corresponds to a magnetic pole of the rotor 2. Thus, in this embodiment, the number of magnetic poles of the rotor 2 is six. At least one permanent magnet 22 is disposed in each permanent magnet insertion hole 211.

In the xy plane, a center portion of each permanent magnet insertion hole 211 projects toward the axis line Ax. That is, in the xy plane, each permanent magnet insertion hole 211 has a V shape. The shape of each permanent magnet insertion hole 211 is not limited to the V shape, and may be a straight shape, for example.

In this embodiment, two permanent magnets 22 are disposed in one permanent magnet insertion hole 211. That is, two permanent magnets 22 are disposed for one magnetic pole. Thus, in the xy plane, one pair of permanent magnets 22 is disposed in one permanent magnet insertion hole 211 to have a V shape. In this embodiment, the rotor 2 includes 12 permanent magnets 22.

The shaft 24 is fixed to the shaft hole 212 by, for example, shrink fitting or press fitting.

Each of the permanent magnets 22 is a flat magnet elongated in the axial direction. Each permanent magnet 22 is a rare earth magnet containing, for example, neodymium (Nd), iron (Fe), and boron (B). Two permanent magnets 22 disposed in one permanent magnet insertion hole 211 serve as one magnetic pole of the rotor 2.

The rotor core 21 further includes a plurality of outside slits 213 and a plurality of inside slits 214.

Figure 3:
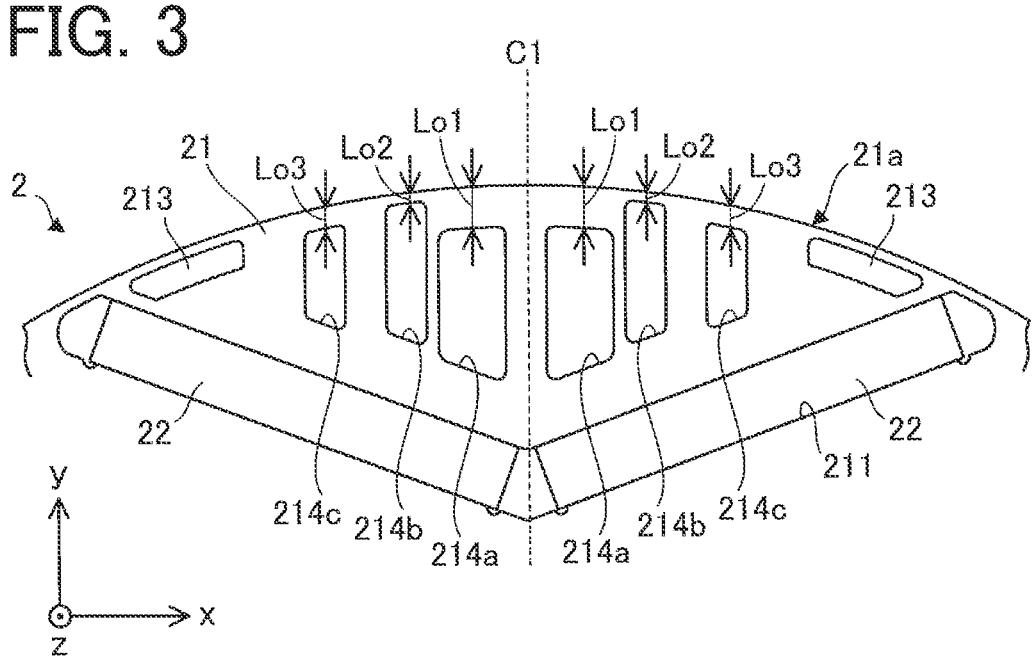
FIG. 3 is an enlarged view schematically illustrating a structure of a part of the rotor illustrated in FIG. 2.

Each of the outside slits 213 is disposed between the permanent magnet insertion hole 211 and an outer peripheral surface 21a of the rotor core 21. Each of the outside slits 213 extends in the circumferential direction of the rotor core 21. As illustrated in FIG. 3, two outside slits 213 for one magnetic pole are disposed between the permanent magnet insertion hole 211 and the outer peripheral surface 21a of the rotor core 21. In this embodiment, however, the rotor core 21 includes 12 outside slits 213.

In each magnetic pole, one of the two outside slits 213 is located at one end of the permanent magnet insertion hole 211 and the other outside slit 213 is located at the other end of the permanent magnet insertion hole 211. In other words, at each magnetic pole, one of the two outside slits 213 is opposed to one end of the permanent magnet insertion hole 211, and the other outside slit 213 is opposed to the other end of the permanent magnet insertion hole 211. Accordingly, each of the outside slits 213 reduces leakage of magnetic flux in the rotor 2. That is, each outside slit 213 serves as a flux barrier.

Each inside slit 214 is provided between the permanent magnet insertion hole 211 and the outer peripheral surface 21a of the rotor core 21. Specifically, in each magnetic pole, the plurality of inside slits 214 are provided between two outside slits 213. The plurality of inside slits 214 are arranged in the circumferential direction of the rotor core 21. More specifically, the plurality of inside slits 214 are arranged in a direction orthogonal to imaginary lines passing through the magnetic pole center parts C1 in the xy plane. In the example illustrated in FIGS. 2 and 3, each of the imaginary lines passing through the magnetic pole center parts C1 passes through two permanent magnets 22. The imaginary lines passing through the magnetic pole center parts C1 are represented as broken lines in FIGS. 2 and 3. In each magnetic pole, the inside slits 214 extend in parallel with the imaginary line passing through the magnetic pole center part C1.

The plurality of inside slits 214 include at least one first inside slit 214a, at least one second inside slit 214b, and at least one third inside slit 214c.

Each first inside slit 214a is adjacent to the magnetic pole center part C1. That is, each first inside slit 214a is closest to the magnetic pole center part C1 in the inside slits 214.

Each second inside slit 214b is adjacent to the first inside slit 214a, and is located between the first inside slit 214a and the third inside slit 214c.

Each third inside slit 214c is adjacent to the second inside slit 214b.

In the xy plane, the first inside slit 214a, the second inside slit 214b, and the third inside slit 214c are arranged in this order in a direction away from the magnetic pole center part C1. That is, one set of inside slits 214 (specifically, one first inside slit 214a, one second inside slit 214b, and one third inside slit 214c) is provided between the magnetic pole center part C1 and one outside slit 213 (e.g., the right outside slit 213 in FIG. 3). Similarly, another set of inside slits 214 (specifically, another first inside slit 214a, another second inside slit 214b, and another third inside slit 214c) is provided between the magnetic pole center part C1 and another outside slit 213 (e.g., the left outside slit 213 in FIG. 3).

That is, in each magnetic pole of the rotor 2, the rotor core 21 includes one set of inside slits 214 between the magnetic pole center part C1 and one outside slit 213, and also includes another set of inside slits 214 between the magnetic pole center part C1 and yet another outside slit 213.

In this embodiment, in each magnetic pole of the rotor 2, the plurality of inside slits 214 (e.g., the right set of inside slits 214 and the left set of inside slits 214 in FIG. 3) are symmetric with respect to the magnetic pole center part C1. In other words, in each magnetic pole of the rotor 2, the plurality of inside slits 214 are symmetrically disposed with respect to the magnetic pole center part C1.

In each magnetic pole of the rotor 2, two first inside slits 214a, two second inside slits 214b, and two third inside slits 214c are provided between two outside slits 213. That is, in this embodiment, in each magnetic pole, six inside slits 214 are provided between two outside slits 213. However, the number of inside slits 214 in each magnetic pole is not limited to six.

Since the plurality of inside slits 214 are provided between the permanent magnet insertion hole 211 and the outer peripheral surface 21a of the rotor core 21, a harmonic component of a magnetic flux density waveform from the rotor 2 can be reduced. Accordingly, a harmonic component of an induced voltage in the winding 32 and cogging torque can be reduced.

In general, however, a hole between a permanent magnet insertion hole and the outer peripheral surface of a rotor core increases a magnetic resistance and reduces an inductance. Consequently, in a pulse width modulation control method (also referred to as a PWM control method), for example, a harmonic component of a carrier wave for generating a PWM control signal increases, and vibrations and noise in an electric motor increase.

FIG. 3 is an enlarged view schematically illustrating a structure of a part of the rotor 2 illustrated in FIG. 2.

A distance Lo1 is a minimum distance from the first inside slit 214a to the outer peripheral surface 21a of the rotor core 21. A distance Lo2 is a minimum distance from the second inside slit 214b to the outer peripheral surface 21a of the rotor core 21. A distance Lo3 is a minimum distance from the third inside slit 214c to the outer peripheral surface 21a of the rotor core 21.

In this embodiment, the distance Lo1 as the minimum distance from the first inside slit 214a to the outer peripheral surface 21a of the rotor core 21 is longer than the minimum distance from any other inside slit 214 except the first inside slit 214a to the outer peripheral surface 21a of the rotor core 21. In other words, the distance Lo1 is the longest of the distances from the plurality of inside slits 214 to the outer peripheral surface 21a of the rotor core 21. In the example illustrated in FIG. 3, the distance Lo1 is longer than the distance Lo2 and longer than the distance Lo3.

A relationship between the distance Lo1 and a minimum value Lo_min satisfies 3<Lo1/Lo_min, where Lo_min is a minimum value of minimum distances from the inside slits 214 except the first inside slit 214a of the plurality of inside slits 214 between the magnetic pole center part C1 and one outside slit 213, to the outer peripheral surface 21a of the rotor core 21.

In the example illustrated in FIG. 3, Lo1>Lo3>Lo2. In the example illustrated in FIG. 3, a minimum value of the minimum distance from each inside slit 214 to the outer peripheral surface 21a of the rotor core 21 is Lo2. That is, in the example illustrated in FIG. 3, Lo_min=Lo2. In this case, the relationship between the distance Lo1 and the minimum value Lo2 satisfies 3<Lo1/Lo2.

Figure 4:
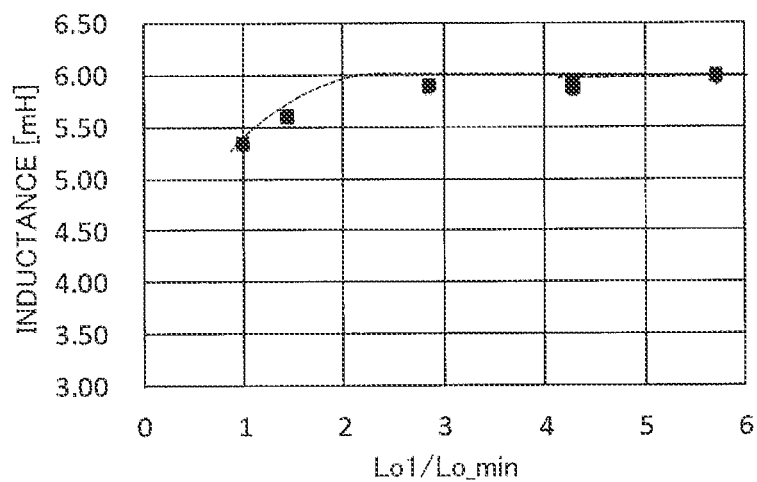
FIG. 4 is a diagram showing a relationship between a ratio Lo1/Lo_min and a q-axis inductance.

FIG. 4 is a diagram showing a relationship between a ratio Lo1/Lo_min and a q-axis inductance.

In the range Lo1/Lo_min≤3, since a magnetic resistance in the q-axis direction increases near the outer peripheral surface 21a of the rotor core 21, the q-axis inductance rapidly decreases, as shown in FIG. 4.

As described above, in this embodiment, the relationship between the distance Lo1 and the minimum value Lo_min satisfies 3<Lo1/Lo_min. Accordingly, the magnetic resistance in the q-axis direction decreases near the outer peripheral surface 21a of the rotor core 21, and a decrease in the q-axis inductance can be suppressed. That is, if Lo1/Lo_min is larger than three, a sufficient q-axis inductance is obtained. Consequently, in a PWM control method, a harmonic component of a carrier wave for generating a PWM control signal decreases, and thus vibrations and noise in an electric motor can be reduced.

Figure 5:
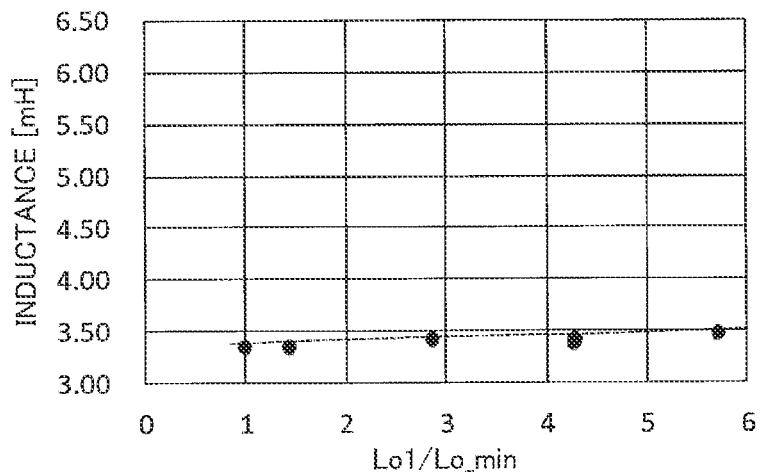
FIG. 5 is a diagram showing a relationship between the ratio Lo1/Lo_min and a d-axis inductance.

FIG. 5 is a diagram showing a relationship between the ratio Lo1/Lo_min and a d-axis inductance.

As shown in FIG. 5, if 3<Lo1/Lo_min, the d-axis inductance increases. Thus, the relationship between the distance Lo1 and the minimum value Lo_min preferably satisfies 3<Lo1/Lo_min. Accordingly, a magnetic resistance in a d-axis direction decreases near the outer peripheral surface 21a of the rotor core 21. Consequently, in a PWM control method, a harmonic component of a carrier wave for generating a PWM control signal decreases, and thus vibrations and noise in an electric motor can be reduced.

Figure 6:
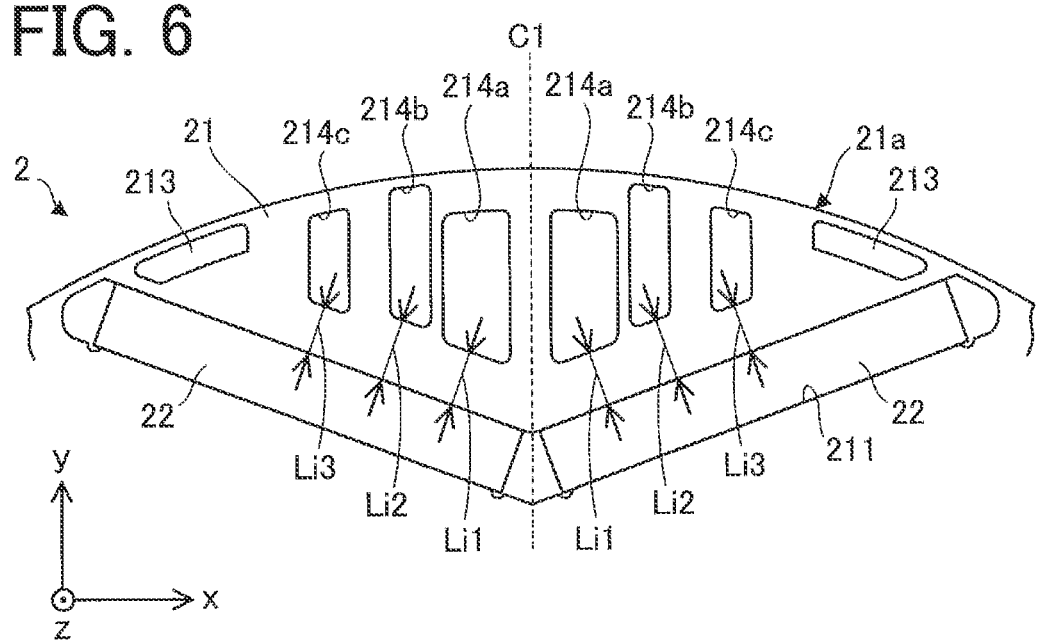
FIG. 6 is an enlarged view schematically illustrating a structure of a part of the rotor illustrated in FIG. 2.

FIG. 6 is an enlarged view schematically illustrating a structure of a part of the rotor 2 illustrated in FIG. 2.

A distance Li1 is a minimum distance from the first inside slit 214a to the permanent magnet insertion hole 211. A distance Li2 is a minimum distance from the second inside slit 214b to the permanent magnet insertion hole 211. A distance Li3 is a minimum distance from the third inside slit 214c to the permanent magnet insertion hole 211.

In this embodiment, the minimum distance from the first inside slit 214a to the permanent magnet insertion hole 211 is longer than the minimum distance from any other inside slit 214 except the first inside slit 214a of the plurality of inside slits 214 between the magnetic pole center part C1 and one outside slit 213, to the permanent magnet insertion hole 211. In other words, the distance Li1 is the longest of the distances from the plurality of inside slits 214 to the permanent magnet insertion hole 211. In the example illustrated in FIG. 6, the distance Li1 is longer than the distance Li2 and longer than the distance Li3.

A relationship between the distance Li1 and the minimum value Li_min satisfies 1<Li1/Li_min, where Li_min is a minimum value of minimum distances from the inside slits 214 except the first inside slit 214a of the plurality of inside slits 214 between the magnetic pole center part C1 and one outside slit 213, to the permanent magnet insertion hole 211.

In the example illustrated in FIG. 6, a minimum value of the minimum distances from the inside slits 214 except the first inside slit 214a to the permanent magnet insertion hole 211 is Li3. That is, in the example illustrated in FIG. 6, Li_min=Li3. In the example illustrated in FIG. 6, Li1>Li3<Li2. In this case, a relationship between the distance Li1 and the minimum value Li3 satisfies 1<Li1/Li3.

Figure 7:
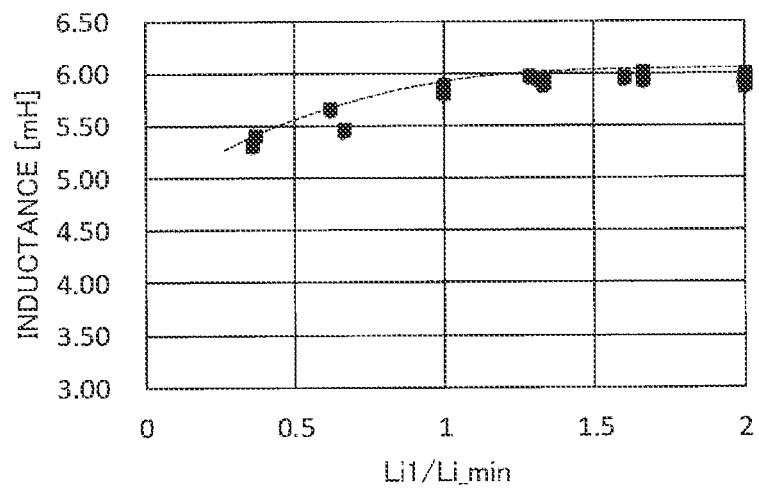
FIG. 7 is a diagram showing a relationship between a ratio Li1/Li_min and a q-axis inductance.

FIG. 7 is a diagram showing a relationship between a ratio Li1/Li_min and a q-axis inductance.

If Li1/Li_min≤1, since the magnetic resistance in the q-axis direction increases near the outer peripheral surface 21a of the rotor core 21, the q-axis inductance rapidly decreases, as shown in FIG. 7.

As described above, in this embodiment, the relationship between the distance Li1 and the minimum value Li_min satisfies 1<Li1/Li_min. Accordingly, the magnetic resistance in the q-axis direction decreases near the outer peripheral surface 21a of the rotor core 21, and a decrease in the q-axis inductance can be suppressed. That is, if Li1/Li_min is larger than one, a sufficient q-axis inductance is obtained. Consequently, in a PWM control method, a harmonic component of a carrier wave for generating a PWM control signal decreases, and thus vibrations and noise in an electric motor can be reduced.

Figure 8:
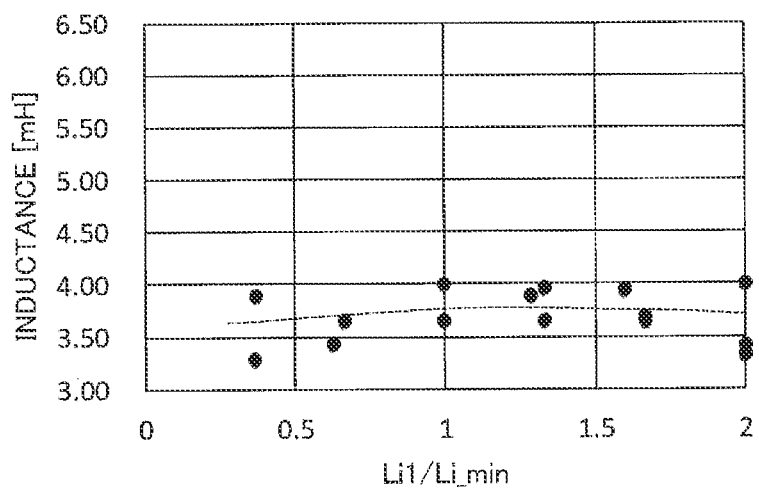
FIG. 8 is a diagram showing a relationship between the ratio Li1/Li_min and a d-axis inductance.

FIG. 8 is a diagram showing a relationship between the ratio Li1/Li_min and the d-axis inductance.

As shown in FIG. 8, a change in d-axis inductance is small, independently of the ratio Li1/Li_min. Thus, the relationship between the distance Li1 and the minimum value Li_min preferably satisfies 1<Li1/Li_min. Accordingly, as described above, vibrations and noise in the electric motor can be reduced.

Figure 9:
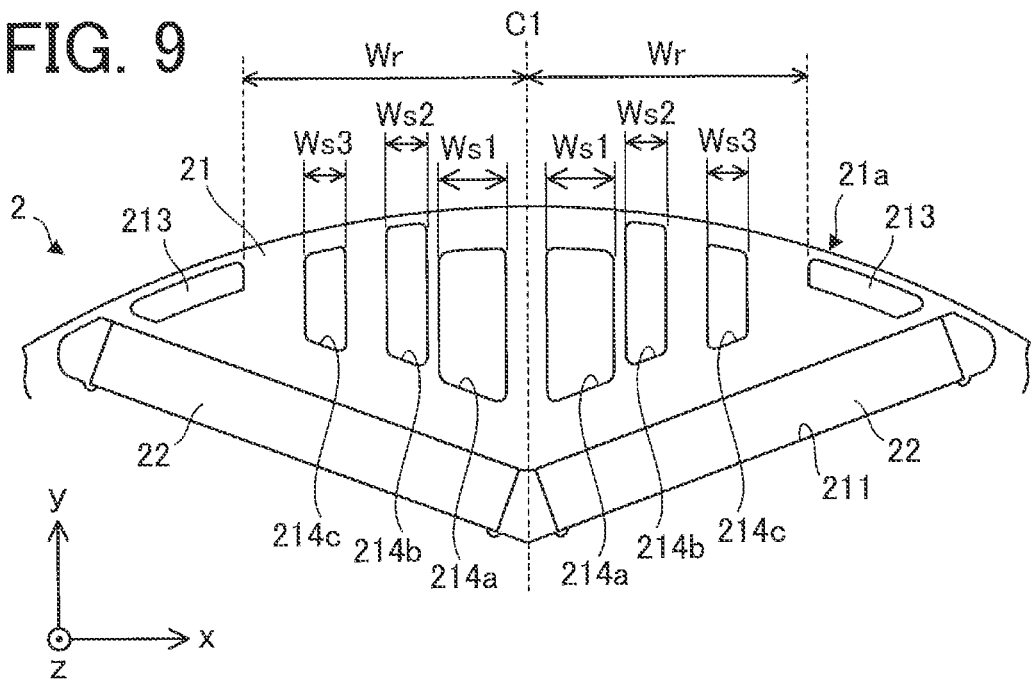
FIG. 9 is an enlarged view schematically illustrating a structure of a part of the rotor illustrated in FIG. 2.

FIG. 9 is an enlarged view schematically illustrating a structure of a part of the rotor 2 illustrated in FIG. 2.

A width Ws1 is a maximum width of the first inside slit 214a in the lateral direction in the xy plane. The lateral direction of the first inside slit 214a is a direction orthogonal to an imaginary line passing through the magnetic pole center part C1 in the xy plane. The width Ws2 is a maximum width of the second inside slit 214b in the lateral direction in the xy plane. The lateral direction of the second inside slit 214b is a direction orthogonal to an imaginary line passing through the magnetic pole center part C1 in the xy plane. The width Ws3 is a maximum width of the third inside slit 214c in the lateral direction in the xy plane. The lateral direction of the third inside slit 214c is a direction orthogonal to an imaginary line passing through the magnetic pole center part C1 in the xy plane. That is, the "lateral direction" is the x-axis direction in FIG. 9.

Supposing the sum of widths of inside slits 214 except the first inside slit 214 of the plurality of inside slits 214 between the magnetic pole center part C1 and one outside slit 213 in the lateral direction is Ws2_total, Ws1/Ws2_total>0.85 is satisfied.

In the example illustrated in FIG. 9, the sum of widths of the inside slits 214 except the first inside slit 214 between the magnetic pole center part C1 and one outside slit 213 is the sum of the width Ws2 and the width Ws3. That is, in the example illustrated in FIG. 9, Ws2_total=Ws2+Ws3. In this case, a relationship between the width Ws1 and the sum of widths Ws2_total satisfies Ws1/(Ws2+Ws3)>0.85.

Figure 10:
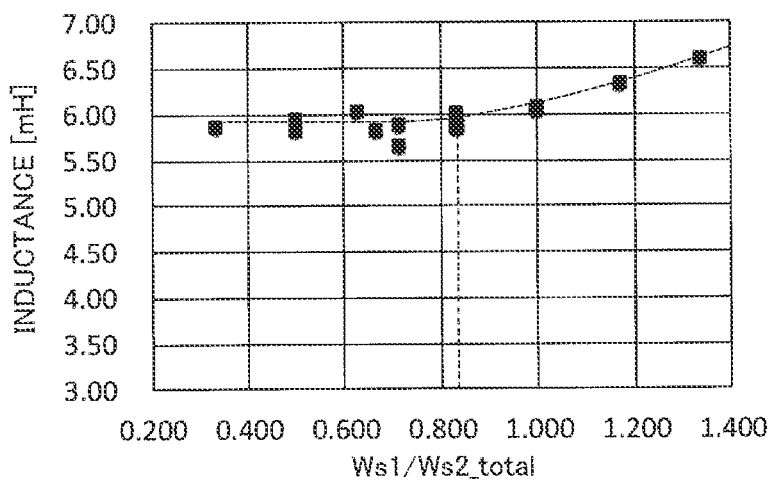
FIG. 10 is a diagram showing a relationship between a ratio Ws1/Ws2_total and a q-axis inductance.

FIG. 10 is a diagram showing a relationship between a ratio Ws1/Ws2_total and the q-axis inductance.

In the range Ws1/Ws2_total≤0.85, since a magnetic resistance in the q-axis direction increases near the outer peripheral surface 21a of the rotor core 21, the q-axis inductance is low, as shown in FIG. 10.

As described above, in this embodiment, the relationship between the width Ws1 and the sum of widths Ws2_total satisfies Ws1/(Ws2+Ws3)>0.85. Accordingly, the magnetic resistance in the q-axis direction decreases near the outer peripheral surface 21a of the rotor core 21, and the q-axis inductance increases. That is, if Ws1/(Ws2+Ws3) is larger than 0.85, a sufficient q-axis inductance is obtained. Consequently, in a PWM control method, a harmonic component of a carrier wave for generating a PWM control signal decreases, and thus vibrations and noise in an electric motor can be reduced.

Figure 11:
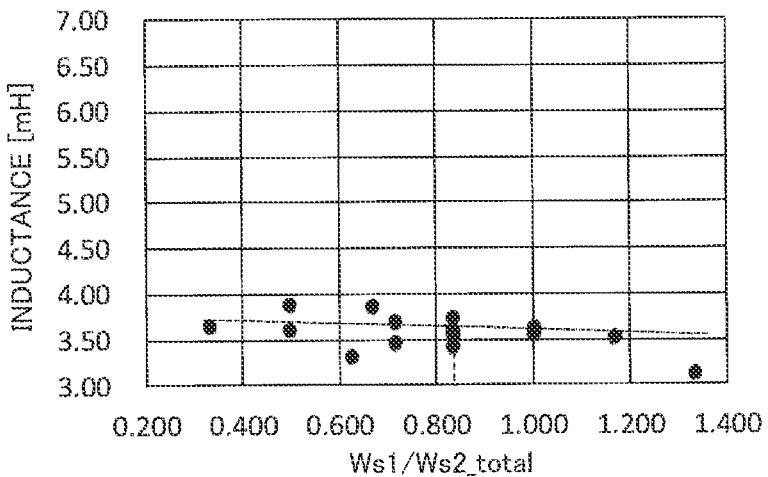
FIG. 11 is a diagram illustrating a relationship between a ratio Ws1/Ws2_total and a d-axis inductance.

FIG. 11 is a diagram showing a relationship between the ratio Ws1/Ws2_total and the d-axis inductance.

As shown in FIG. 11, a sufficient d-axis inductance is maintained, independently of the ratio Ws1/Ws2_total. Thus, the relationship between the width Ws1 and the sum of widths Ws2_total preferably satisfies Ws1/(Ws2+Ws3)>0.85. Accordingly, as described above, vibrations and noise in the electric motor can be reduced.

As shown in FIG. 9, a relationship between a minimum distance Wr and the sum of widths Ws1_total satisfies Ws1_total/Wr<0.62, where a minimum distance from the magnetic pole center part C1 to one outside slit 213 is Wr, and the sum of widths of the plurality of inside slits 214 in the lateral direction between the magnetic pole center part C1 and one outside slit 213 is Ws1_total.

In the example illustrated in FIG. 9, the sum of widths of the plurality of inside slits 214 in the lateral direction between the magnetic pole center part C1 and one outside slit 213 is the sum of the width Ws1, the width Ws2, and the width Ws3. That is, in the example illustrated in FIG. 9, Ws1_total=Ws1+Ws2+Ws3. In this case, a relationship between the minimum distance Wr and the sum of widths Ws1_total satisfies (Ws1+Ws2+Ws3)/Wr<0.62.

Figure 12:
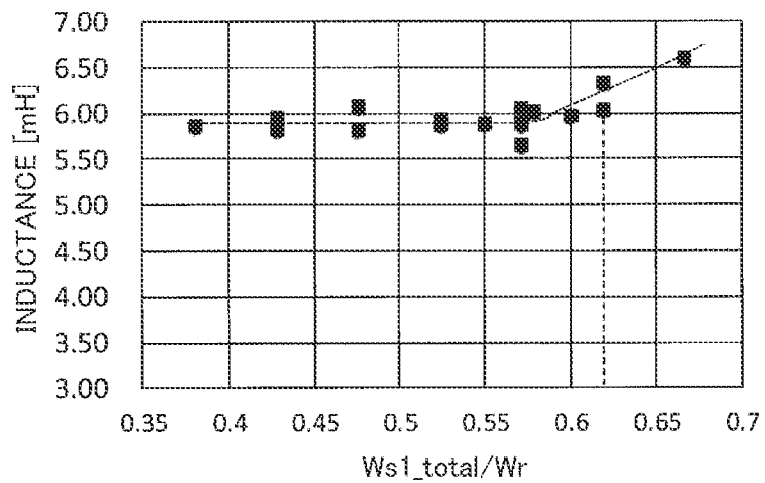
FIG. 12 is a diagram illustrating a relationship between a ratio Ws1_total/Wr and a q-axis inductance.

FIG. 12 is a diagram illustrating a relationship between a ratio Ws1_total/Wr and a q-axis inductance.

As shown in FIG. 12, if Ws1_total/Wr is smaller than 0.62, a change in q-axis inductance is small. In addition, if Ws1_total/Wr is smaller than 0.62, a sufficient q-axis inductance is maintained, independently of the ratio Ws1_total/Wr.

Figure 13:
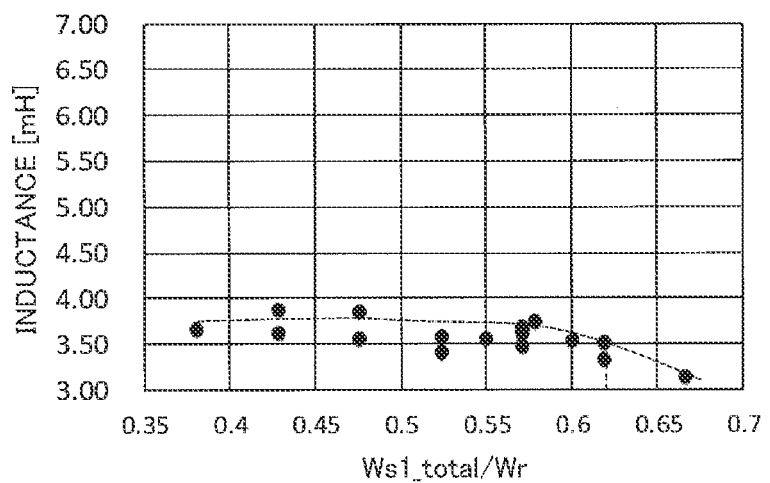
FIG. 13 is a diagram illustrating a relationship between a ratio Ws1_total/Wr and a d-axis inductance.

FIG. 13 is a diagram illustrating a relationship between the ratio Ws1_total/Wr and a d-axis inductance.

If 0.62≤Ws1_total/Wr, since the magnetic resistance in the d-axis direction increases near the outer peripheral surface 21a of the rotor core 21, the q-axis inductance rapidly decreases, as shown in FIG. 13.

As described above, in this embodiment, the relationship between the minimum distance Wr and the sum of widths Ws1_total satisfies Ws1_total/Wr<0.62. Accordingly, a magnetic resistance in the d-axis direction decreases near the outer peripheral surface 21a of the rotor core 21, and a decrease in d-axis inductance can be thereby suppressed. That is, if Ws1_total/Wr is smaller than 0.62, a sufficient d-axis inductance is obtained. Consequently, in a PWM control method, a harmonic component of a carrier wave for generating a PWM control signal decreases, and thus vibrations and noise in an electric motor can be reduced.

The relationship between the minimum distance Wr and the sum of widths Ws1_total more preferably satisfies Ws1_total/Wr<0.6. Accordingly, a magnetic resistance in the d-axis direction further decreases near the outer peripheral surface 21a of the rotor core 21, and a decrease in d-axis inductance can be effectively suppressed. That is, if Ws1_total/Wr is smaller than 0.60, the d-axis inductance further increases. Consequently, in a PWM control method, a harmonic component of a carrier wave for generating a PWM control signal decreases, and thus vibrations and noise in an electric motor can be reduced.

Figure 14:
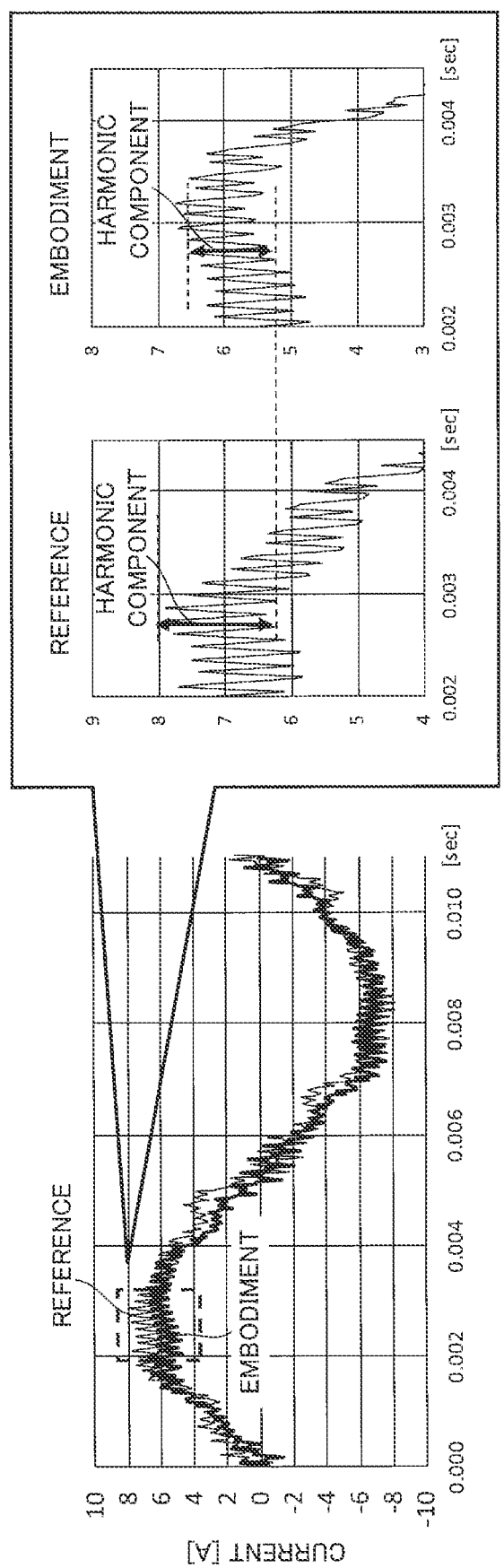
FIG. 14 is a diagram showing a waveform of a carrier wave in an electric motor.

FIG. 14 is a diagram showing a waveform of a carrier wave in the electric motor 1.

In FIG. 14, a bold line represents a carrier wave in the electric motor 1, and a thin line represents a carrier wave in an electric motor as a reference. In a rotor of the electric motor as a reference, Lo1=Lo2=Lo3 and Li1=Li2=Li3.

As described above, in the electric motor 1 including the rotor 2, a magnetic resistance in the q-axis direction decreases near the outer peripheral surface 21a of the rotor core 21, and a decrease in q-axis inductance can be suppressed. Thus, a sufficient q-axis inductance is obtained. Consequently, as shown in FIG. 14, in a PWM control method, a harmonic component of a carrier wave for generating a PWM control signal decreases, and thus vibrations and noise in an electric motor can be reduced.

Second Embodiment

A compressor 6 according to a second embodiment of the present invention will be described.

Figure 15:
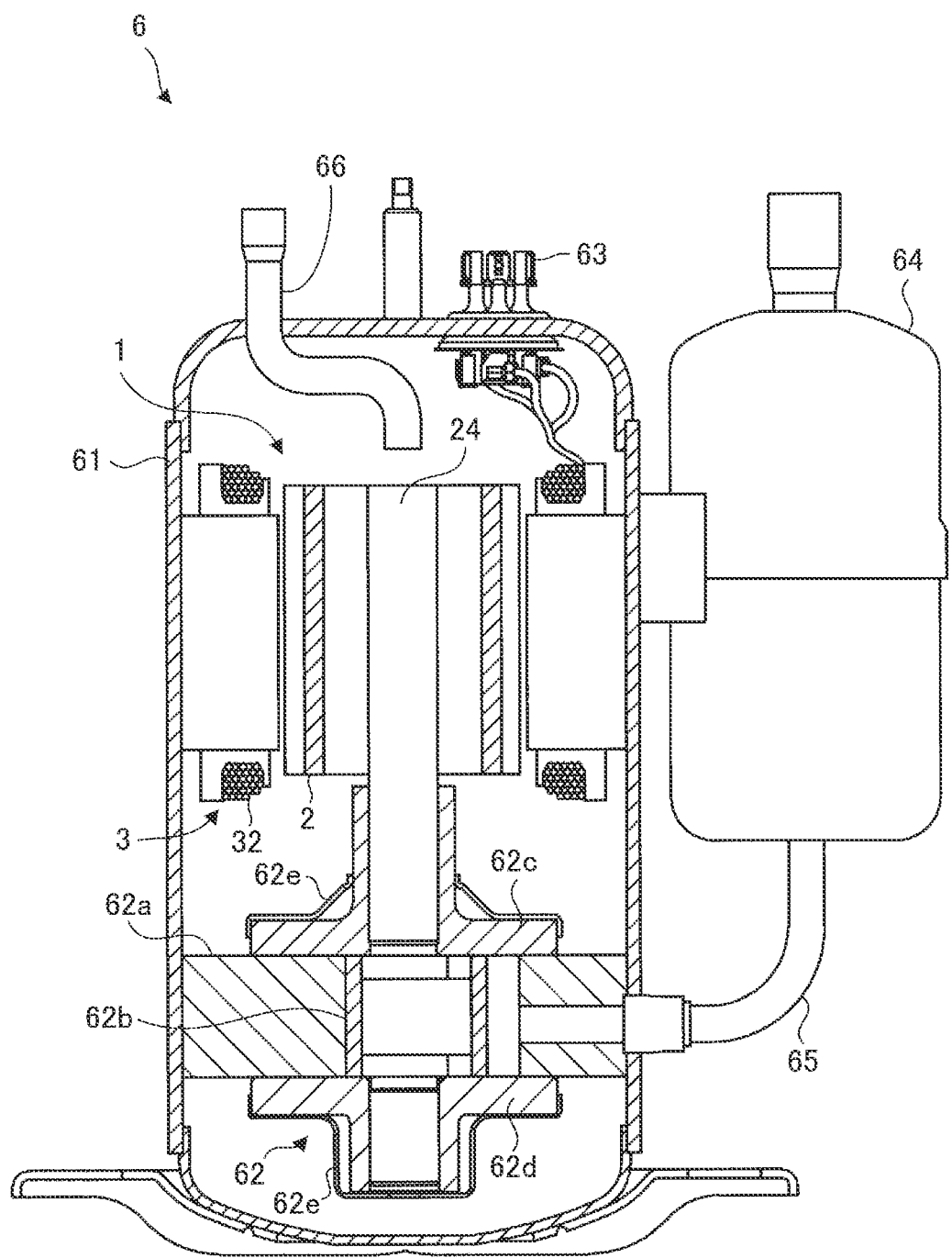
FIG. 15 is a cross-sectional view schematically illustrating a structure of a compressor according to a second embodiment of the present invention.

FIG. 15 is a cross-sectional view schematically illustrating a structure of the compressor 6 according to the second embodiment.

The compressor 6 includes an electric motor 1 as an electric element, a closed container 61 as a housing, and a compressor mechanism 62 as a compression element (also referred to as a compression device). In this embodiment, the compressor 6 is a rotary compressor. It should be noted that the compressor 6 is not limited to the rotary compressor.

The electric motor 1 in the compressor 6 is the electric motor 1 described in the first embodiment. The electric motor 1 drives the compressor mechanism 62.

The closed container 61 covers the electric motor 1 and the compressor mechanism 62. The closed container 61 is a cylindrical container. In a bottom portion of the closed container 61, refrigerating machine oil for lubricating a sliding portion of the compressor mechanism 62 is stored.

The compressor 6 further includes a glass terminal 63 fixed to the closed container 61, an accumulator 64, a suction pipe 65, and a discharge pipe 66.

The compressor mechanism 62 includes a cylinder 62a, a piston 62b, an upper frame 62c (also referred to as a first frame), a lower frame 62d (also referred to as a second frame), and a plurality of mufflers 62e attached to the upper frame 62c and the lower frame 62d. The compressor mechanism 62 also includes a vane partitioning the inside of the cylinder 62a into a suction side and a compression side. The compressor mechanism 62 is disposed in the closed container 61. The compressor mechanism 62 is driven by the electric motor 1.

The electric motor 1 is fixed in the closed container 61 by press fitting or shrink fitting. The electric motor 1 may be directly attached to the closed container 61 by welding, instead of press fitting or shrink fitting.

Electric power is supplied to a coil (e.g., the winding 32 described in the first embodiment) of the electric motor 1 through the glass terminal 63.

A rotor 2 (specifically one side of a shaft 24) of the electric motor 1 is rotatably supported by bearings provided on the upper frame 62c and the lower frame 62d.

The shaft 24 is inserted in the piston 62b. The shaft 24 is rotatably inserted in the upper frame 62c and the lower frame 62d. The upper frame 62c and the lower frame 62d close an end face of the cylinder 62a. The accumulator 64 supplies a refrigerant (e.g., refrigerant gas) to the cylinder 62a through the suction pipe 65.

Next, an operation of the compressor 6 will be described. The refrigerant supplied from the accumulator 64 is sucked into the cylinder 62a through the suction pipe 65 fixed to the closed container 61. When the electric motor 1 rotates, the piston 62b fitted in the shaft 24 thereby rotates in the cylinder 62a. Accordingly, the refrigerant is compressed in the cylinder 62a.

The compressed refrigerant passes through the mufflers 62e and rises in the closed container 61. In this manner, the compressed refrigeration cycle is supplied to a high-pressure side of a refrigeration cycle through the discharge pipe 66.

As a refrigerant used in the compressor 6, for example, R410A, R407C, or R22 can be used. It should be noted that a refrigerant for the compressor 6 is not limited to these types. As a refrigerant used in the compressor 6, a refrigerant having a small global warming potential (GWP), e.g., refrigerants described below, can be used.

(1) Halogenated hydrocarbon having a carbon double bond in a composition, such as hydro-fluoro-orefin (HFO)-1234yf (CF3CF=CH2), can be used. HFO-1234yf has a GWP of 4.

(2) Hydrocarbon having a carbon double bond in a composition, such as R1270 (propylene), may be used. R1270 has a GWP of 3, which is lower than that of HFO-1234yf, but has a flammability higher than that of HFO-1234yf.

(3) A mixture including either halogenated hydrocarbon having a carbon double bond in a composition or hydrocarbon having a carbon double bond in a composition, such as a mixture of HFO-1234yf and R32, may be used. HFO-1234yf described above is a low-pressure refrigerant, and thus, has a tendency of having a large pressure loss and consequently degradation of performance of a refrigeration cycle (especially an evaporator) might occur. Accordingly, it is practically preferable to use a mixture including R32 or R41, which is a higher-pressure refrigerant than HFO-1234yf.

The compressor 6 according to the second embodiment has the advantages described in the first embodiment.

In addition, the compressor 6 according to the second embodiment includes the electric motor 1 according to the first embodiment, and thus, vibrations and noise in the compressor 6 can be reduced.

Third Embodiment

A refrigerating and air conditioning apparatus 7 including the compressor 6 according to the second embodiment and serving as an air conditioner will be described.

Figure 16:
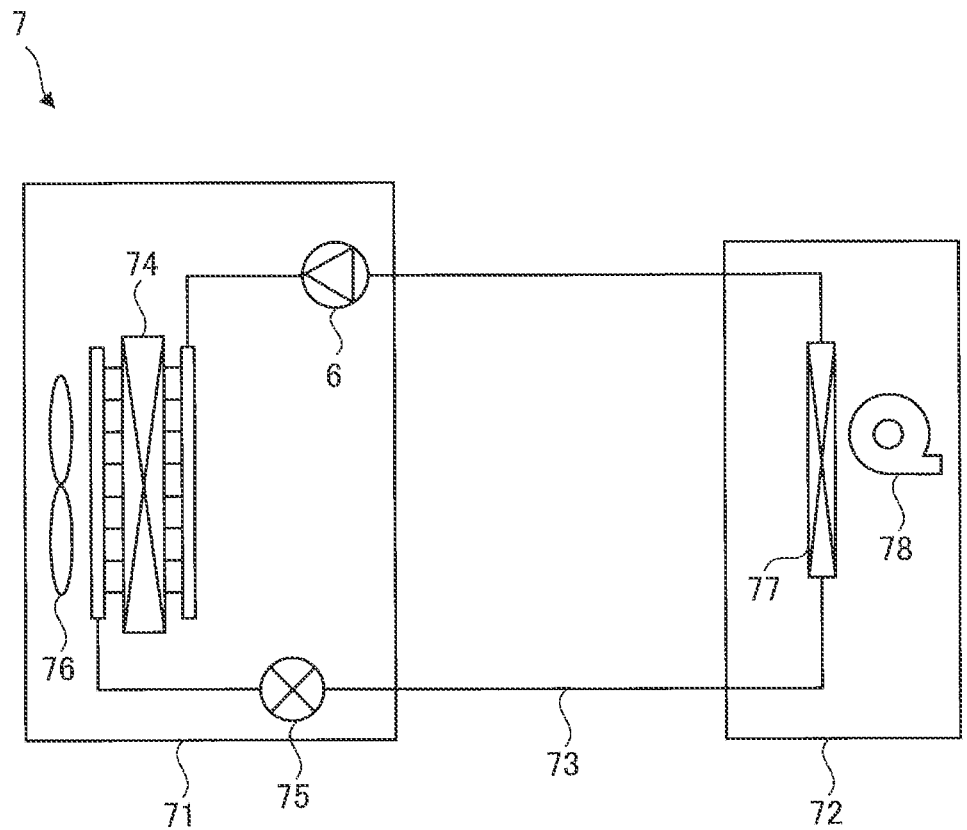
FIG. 16 is a diagram schematically illustrating a configuration of a refrigerating and air conditioning apparatus according to a third embodiment of the present invention.

FIG. 16 is a diagram schematically illustrating a configuration of the refrigerating and air conditioning apparatus 7 according to a third embodiment of the present invention.

The refrigerating and air conditioning apparatus 7 is capable of performing heating and operations, for example. A refrigerant circuit diagram illustrated in FIG. 16 is an example of a refrigerant circuit diagram of an air conditioner capable of performing a cooling operation.

The refrigerating and air conditioning apparatus 7 according to the third embodiment includes an outdoor unit 71, an indoor unit 72, and a refrigerant pipe 73 connecting the outdoor unit 71 and the indoor unit 72.

The outdoor unit 71 includes the compressor 6, a condenser 74 as a heat exchanger, a throttling device 75, and an outdoor fan 76 (first fan). The condenser 74 condenses a refrigerant compressed by the compressor 6. The throttling device 75 reduces the pressure of the refrigerant condensed by the condenser 74 and adjusts a flow rate of the refrigerant. The throttling device 75 is also referred to as a decompressor.

The indoor unit 72 includes an evaporator 77 as a heat exchanger and an indoor fan 78 (second fan). The evaporator 77 evaporates the refrigerant decompressed by the throttling device 75 and cools indoor air.

A basic operation in a cooling operation of the refrigerating and air conditioning apparatus 7 will be described below. In a cooling operation, a refrigerant is compressed by the compressor 6 and flows into the condenser 74. The refrigerant is condensed by the condenser 74, and the condensed refrigerant flows into the throttling device 75. The refrigerant is decompressed by the throttling device 75, and the decompressed refrigerant flows into the evaporator 77. The refrigerant evaporates in the evaporator 77, and the refrigerant (specifically a refrigerant gas) flows into the compressor 6 of the outdoor unit 71 again. When air is sent to the condenser 74 by the outdoor fan 76, heat moves between the refrigerant and air. Similarly, when air is sent to the evaporator 77 by the indoor fan 78, heat moves between the refrigerant and air.

A configuration and an operation of the refrigerating and air conditioning apparatus 7 described above is an example and is not limited to the example described above.

The refrigerating and air conditioning apparatus 7 according to the third embodiment has the advantages described in the first and second embodiments.

In addition, since the refrigerating and air conditioning apparatus 7 according to the third embodiment includes the compressor 6 according to the second embodiment, vibrations and noise in the refrigerating and air conditioning apparatus 7 can be reduced.

As described above, although preferred embodiments have been specifically described above, it is obvious that various modifications can be made by those skilled in the art based on a basic technical idea and teaching of the present invention.

Features of the embodiments described above can be combined as appropriate.

What is claimed is:

1. A rotor including a magnetic pole center part, the rotor comprising:
a rotor core including a permanent magnet insertion hole having a V shape in a plane orthogonal to an axial direction of the rotor; and
a permanent magnet disposed in the permanent magnet insertion hole, wherein
the rotor core includes
an outside slit provided between the permanent magnet insertion hole and an outer peripheral surface of the rotor core and extending in a circumferential direction of the rotor core, and
a plurality of inside slits provided between the magnetic pole center part and the outside slit and arranged in the circumferential direction,
the plurality of inside slits include a first inside slit adjacent to the magnetic pole center part, a second inside slit, and a third inside slit,
the first inside slit, the second inside slit, and the third inside slit are arranged in this order in a direction away from the magnetic pole center part,
a minimum distance from the first inside slit to the outer peripheral surface of the rotor core is longer than a minimum distance from any other inside slit except the first inside slit of the plurality of inside slits to the outer peripheral surface of the rotor core, and
the rotor satisfies $Lo1>Lo3>Lo2$,
wherein $Lo1$ is the minimum distance from the first inside slit to the outer peripheral surface of the rotor core, $Lo2$ is a minimum distance from the second inside slit to the outer peripheral surface of the rotor core, and $Lo3$ is a minimum distance from the third inside slit to the outer peripheral surface of the rotor core.

2. The rotor according to claim 1, wherein the rotor satisfies $3<Lo1/Lo\_min$
where $Lo\_min$ is a minimum value of minimum distances from inside slits except the first inside slit of the plurality of inside slits to the outer peripheral surface of the rotor core.

3. The rotor according to claim 1, wherein a minimum distance from the first inside slit to the permanent magnet insertion hole is longer than a minimum distance from any other inside slit except the first inside slit of the plurality of inside slits to the permanent magnet insertion hole.

4. The rotor according to claim 1, wherein the rotor satisfies $1<Li1/Li\_min$
where $Li1$ is a minimum distance from the first inside slit to the permanent magnet insertion hole and $Li\_min$ is a minimum value of minimum distances from inside slits except the first inside slit of the plurality of inside slits to the permanent magnet insertion hole.

5. The rotor according to claim 1, wherein the rotor satisfies $Ws1/Ws2\_total>0.85$
where $Ws1$ is a width of the first inside slit in a lateral direction and $Ws2\_total$ is the sum of widths of inside slits except the first inside slit of the plurality of inside slits in the lateral direction, in a plane orthogonal to an axial direction of the rotor.

6. The rotor according to claim 1, wherein the rotor satisfies $Ws1\_total/Wr<0.62$
where $Wr$ is a minimum distance from the magnetic pole center part to the outside slit and $Ws1\_total$ is the sum of widths of the plurality of inside slits in a lateral direction.

7. The rotor according to claim 1, wherein
the rotor core further includes a set of inside slits, and
the plurality of inside slits and the set of inside slits are symmetric with respect to the magnetic pole center part.

8. An electric motor comprising:
a stator; and
the rotor according to claim 1 disposed inside the stator.

9. A compressor comprising:
a closed container;
a compression device disposed inside the closed container; and
the electric motor according to claim 8 to drive the compression device.

10. An air conditioner, comprising:
the compressor according to claim 9; and
a heat exchanger.

* * * * *